United States Patent
Polka

(10) Patent No.: US 6,467,852 B1
(45) Date of Patent: Oct. 22, 2002

(54) ATTACHMENT FOR RETAINING A COVERING OVER THE AXLE HUB OF A WHEEL

(76) Inventor: John G. Polka, 1355 Margate, Libertyville, IL (US) 60048

(*) Notice: Subject to any disclaimer, the term of this patent is extended or adjusted under 35 U.S.C. 154(b) by 0 days.

(21) Appl. No.: 09/710,081

(22) Filed: Nov. 9, 2000

(51) Int. Cl.⁷ .............................................. B60B 7/12
(52) U.S. Cl. ............................. 301/37.32; 301/108.4
(58) Field of Search ....................... 301/37.101, 37.102, 301/37.32, 37.371, 108.1, 108.3, 108.4

(56) References Cited

U.S. PATENT DOCUMENTS

| | | | | |
|---|---|---|---|---|
| 4,470,638 A | * | 9/1984 | Bartylla | 301/37.31 |
| 4,626,037 A | * | 12/1986 | Kushner | 301/108.4 |
| 5,366,279 A | * | 11/1994 | Polka | 301/108.1 |
| 5,676,430 A | * | 10/1997 | Wright et al. | 301/108.4 |
| 5,876,099 A | * | 3/1999 | Irgens-Moller et al. | 301/108.4 |

* cited by examiner

Primary Examiner—Russell D. Stormer
(74) Attorney, Agent, or Firm—Robert L. Marsh

(57) ABSTRACT

To retain a decorative tubular cover having a given inner diameter over the axle hub of a wheel, a strap having a plurality of radially extending arms thereon is tightened around the circumference of the axle hub. The ends of the arms define a circle having a diameter a little larger than the given inner diameter of the tubular cover. The tubular cover is pushed over the arms until the open end thereof rests against the web of the wheel where it is retained by the outwardly directed forces applied by the arms.

4 Claims, 5 Drawing Sheets

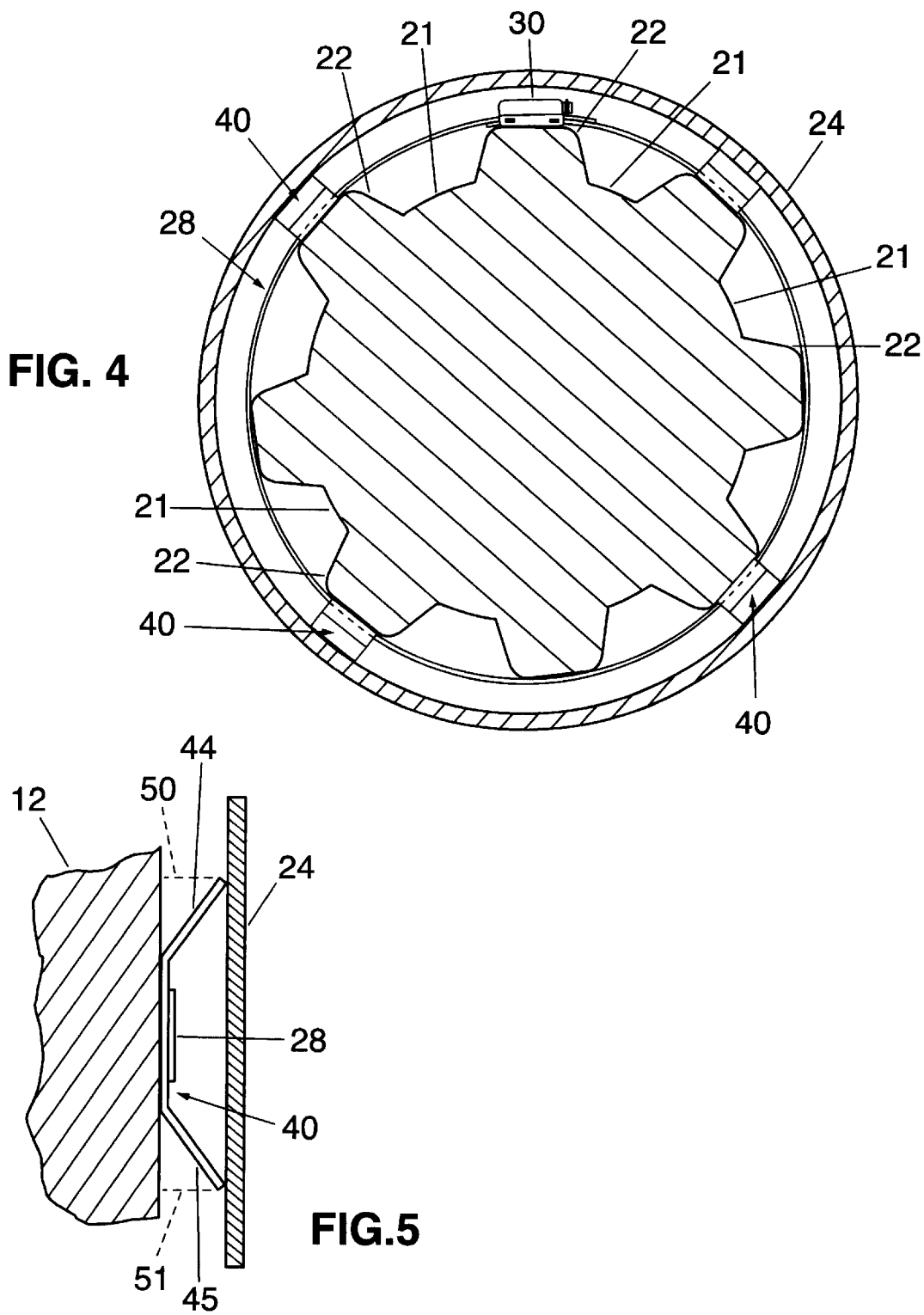

ATTACHMENT FOR RETAINING A COVERING OVER THE AXLE HUB OF A WHEEL

The present invention relates to a method for installing a single sized decorative covering over the axle hub of a truck wheel or a trailer wheel, including axles of trailers and trucks which have outer diameters of either 8½ inches and 6¼ inches.

BACKGROUND OF THE INVENTION

The rear wheels of trucks have a generally cylindrical section around which a tire is mounted and the wheel is retained to the axle hub by lug nuts extending from a flange mounted on the axle hub and through holes in the web of the wheel. The distal end of the axle hub extends through the center of the wheel and often has a removable oil hub into which lubricating material may be inserted.

For large trucks, the portion of the rear axle hub which extends through the central opening of a wheel is typically 8½ inches in diameter. Many manufacturers market a decorative covering or "high hat" for enclosing the distal end of a truck axle hub and these decorative covers have an inner diameter which is a little larger than the 8½ inch diameter of the axle. There are many methods for retaining a covering over a truck axle hub and one method, described in my prior U.S. Pat. No. 5,366,279, requires a foam sleeve which is fitted around the end of the truck axle hub.

There are circumstances under which a decorative cover being retained over the axle hub of a wheel must be repeatedly removed. For example, the state of California requires that the webs of truck wheels be frequently checked for cracks near the holes for the lug nuts. I have found that after several removals and reinstallations of a wheel cover retained using the apparatus of my U.S. Pat. No. 5,366,279, the foam sleeve becomes damaged replacement is required. There is, therefore, a need for a more durable or reusable apparatus for retaining a cover over the axle hub.

Smaller trucks and some trailers have axle hubs that are 6¼ inches in diameter, and it is the practice to cover 6¼ inch axles with the same size cover used to cover the 8½ inch axle hubs. There is considerably more space between the outer surface of a 6¼ inch axle hub and the inner surface of the standard size wheel than is the case for an 8½ inch axle hub, and a correspondingly thicker foam sleeve is required where the method of my U.S. Pat. No. 5,366,279 is to be employed to retain a cover to a 6¼ inch diameter axle hub. There is, therefor, also a need for a better method for retaining a decorative axle hub cover over the axle hubs having either 6¼ inches or 8½ inch diameters.

SUMMARY OF THE INVENTION

Briefly, the present invention is embodied in an attachment for retaining a generally tubular cover with an open end and a closed end over the distal end of a generally cylindrical axle hub. To retain the cover an annular strap is provided which is tightened around the circumference of the axle hub so as to be retained in place. The strap has a plurality of spring loaded radially extending prongs spaced around the circumference thereof. The prongs have arms which extend radially outward of the outer surface of the strap and the ends thereof define a circle having a diameter which is a little greater than the inner diameter of the cylindrical cover.

Although some truck axle hubs are cylindrical, most have a plurality of equally spaced longitudinal ribs between which are grooves. Most 8½ inch truck axle hubs have eight ribs, and many 6¼ inch truck axle hubs have twelve ribs. To provide support to the prongs, the prongs are spaced apart by a distance equal to the arc length between two ribs, or equal to a multiple of the arc length between two ribs. When the strap is fastened around the axle hub of a wheel, all of the prongs are positioned to be over ribs such that a rib will radially support the inner surface of each prong. The tubular cover is then fitted over the radially extending spring prongs and is retained in place by the radially outwardly directed forces applied by the prongs against the inner surface of the cylindrical cover.

GENERAL DESCRIPTION OF THE DRAWINGS

A better and more complete understanding of the present invention will be had after a reading of the following detailed description taken in conjunction with the drawings wherein:

FIG. 4 is a cross sectional view of the axle hub, the strap, and the cover of FIGS. 2 and 3 shown in assembled relationship;

FIG. 5 is an enlarged fragmentary cross sectional view of the parts taken through line 5—5 of FIG. 4; and, FIG. 6 is an isometric view of a 6¼ inch axle hub having twelve ribs with a strap attached thereto for receiving a cover.

DETAILED DESCRIPTION OF THE PREFERRED EMBODIMENT

Figure 1:
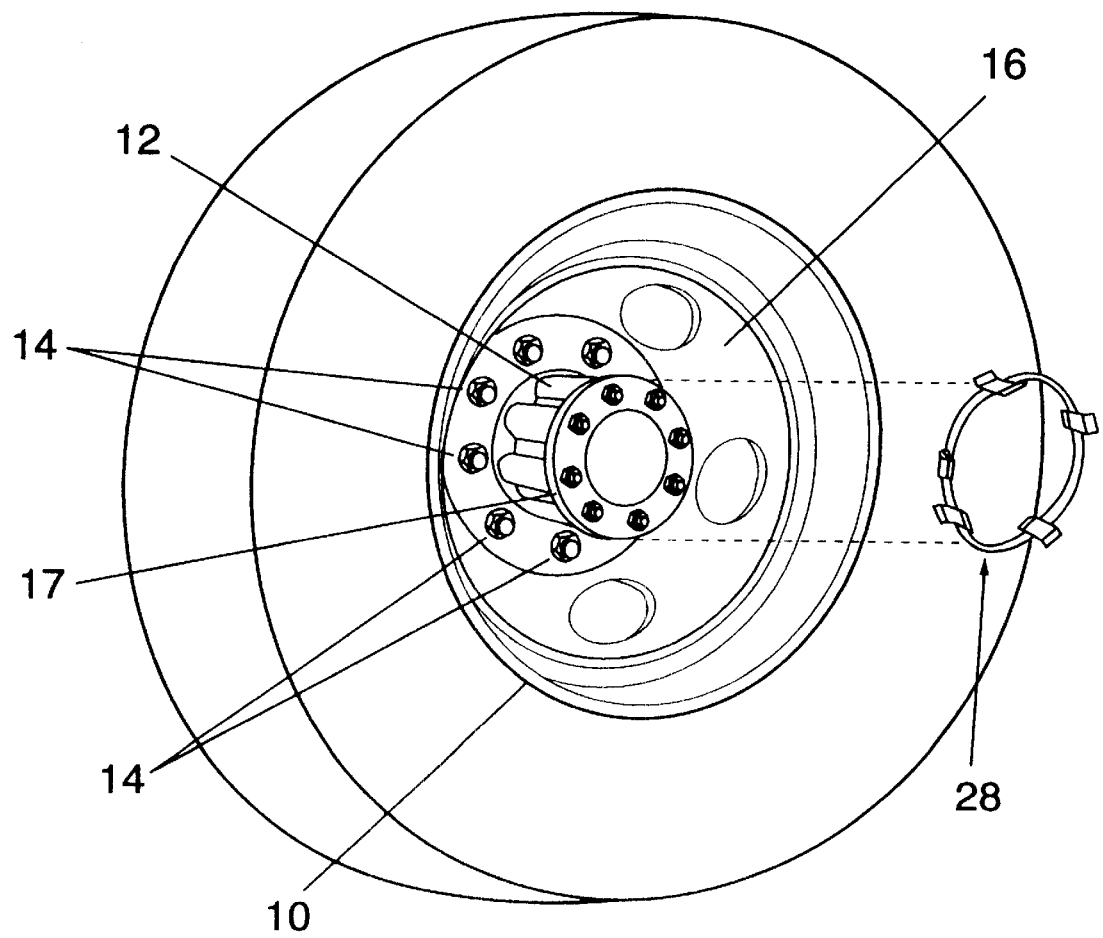
FIG. 1 is an isometric view of a truck wheel having an axle hub projecting through the center of the wheel.
Figure 2:
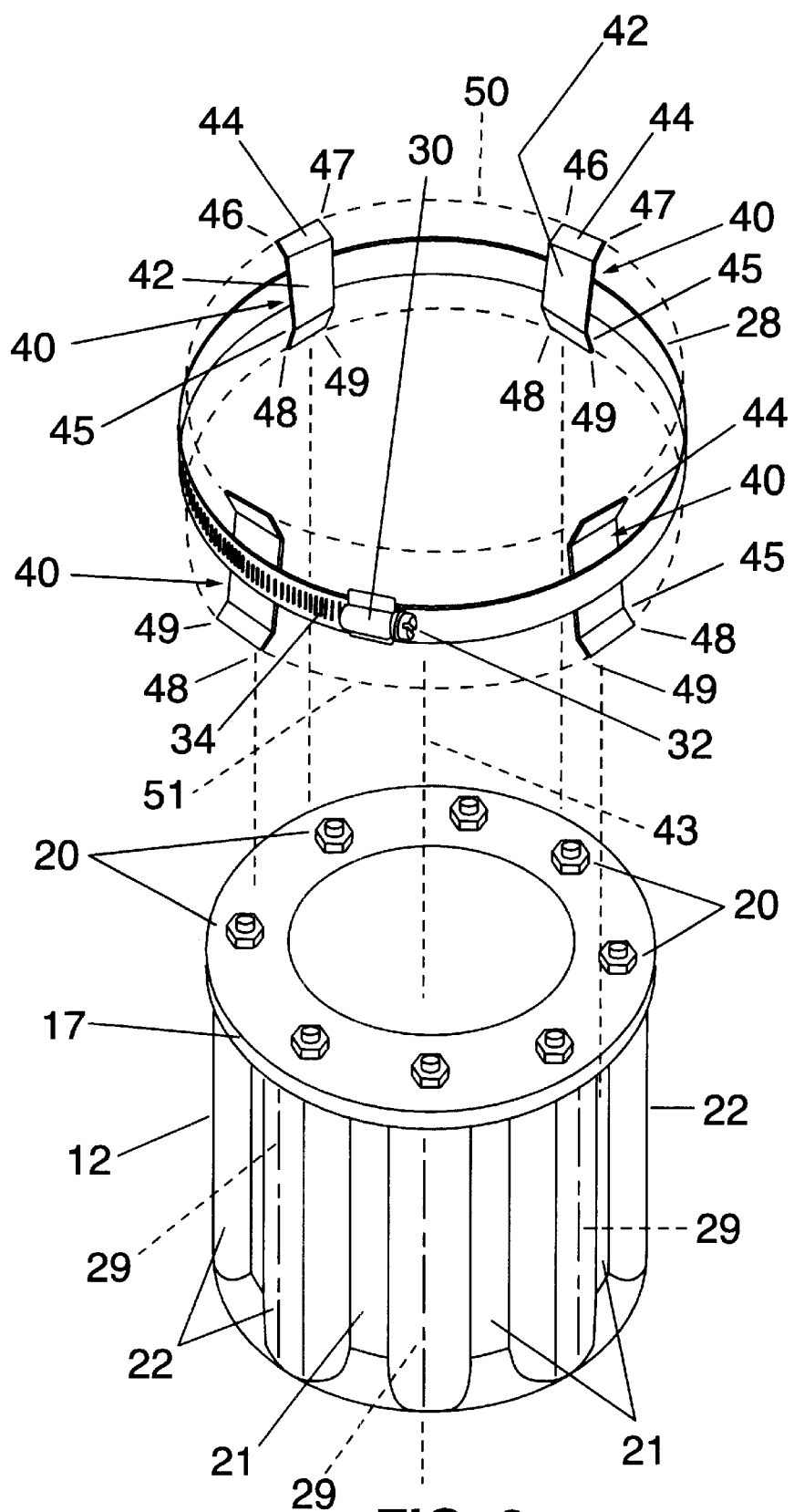
FIG. 2 is an enlarged isometric view of the end of an 8½ inch truck axle hub with a strap according to the invention ready for attachment thereto.

Referring to FIGS. 1 and 2 the wheel 10 of a truck or trailer, not shown, is retained around an axle hub 12 by a plurality of lug nuts 14 which are fitted over studs, unnumbered, extending through holes in a web 16 of the wheel 10.

The distal end of the axle hub 12 has an oil cap 17 retained thereon by a plurality of bolts 20, and the outer wall of the axle hub has a plurality of longitudinal grooves 21 therein, between which are longitudinal ribs 22. When there are ribs 22 and grooves 21 as shone, each rib 22 is aligned behind one of the bolts 20 which retain the oil cap 17. Trucks having an 8½ inch diameter axle hub 12 typically have eight ribs 22 and trucks having an 6¼ inch diameter axle hub (bearing indicia No. 60 in FIG. 6) are either cylindrical (without ribs) or have twelve ribs 22.

Figure 3:
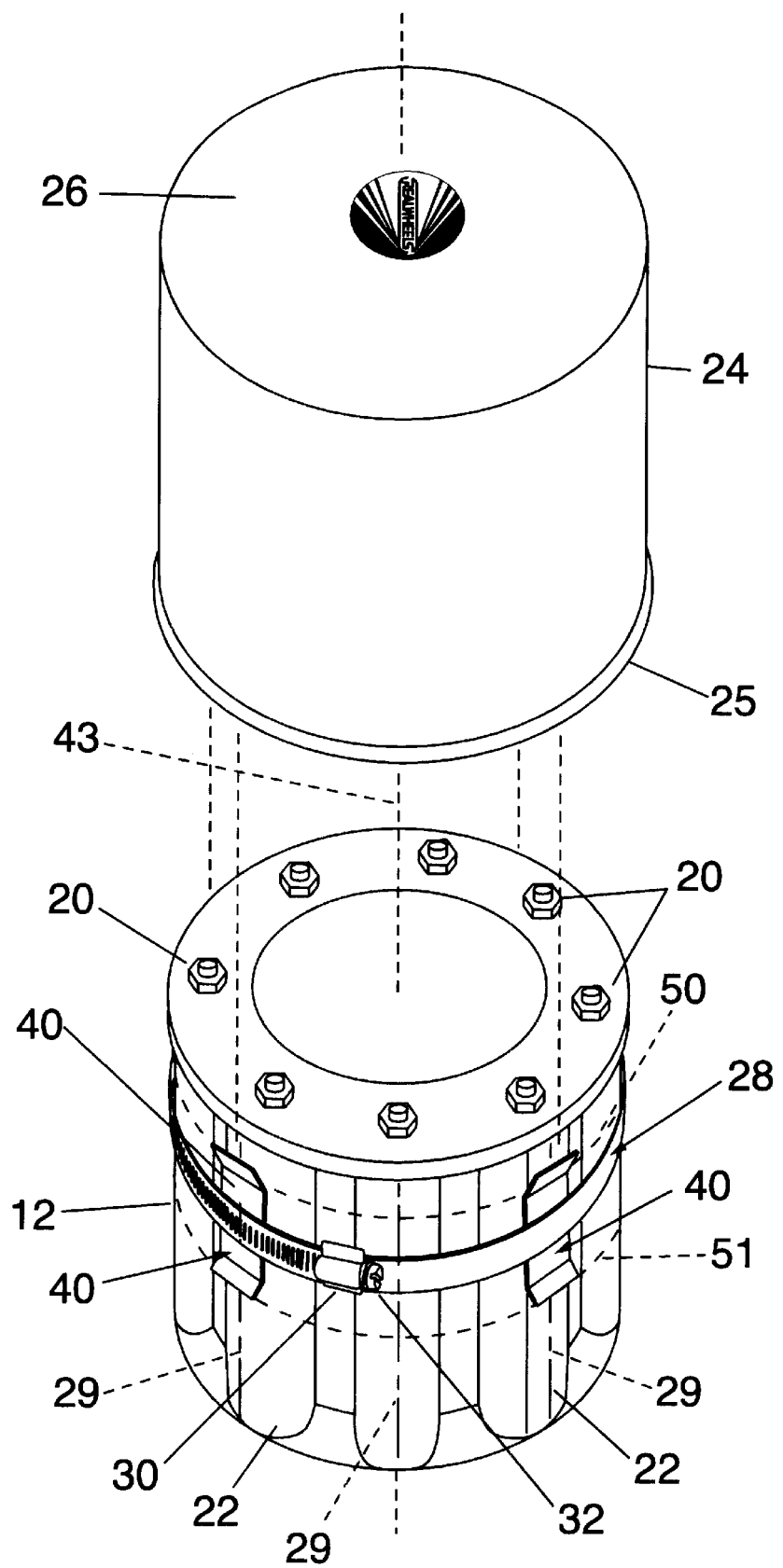
FIG. 3 is an isometric view of the truck axle hub shown in FIG. 2 with the strap attached thereto and the tubular cover ready for attachment thereto.

Referring to FIGS. 2 and 3 to enhance the appearance of the central portion of the wheel 10, the axle hub 12 is covered by a generally tubular cover 24 having an open end 25 and a closed end 26. To retain the cover 24 over the cylindrical outer surface of the axle hub 12, a generally flexible adjustable metal strap 28 is fitted around the circumference of the axle hub 12. In the preferred embodiment, the strap 28 is of the type commonly known as a hose clamp and includes an adjustable connector 30 at one end thereof. The adjustable connector 30 has a screw 32 therein the threads of which engage a plurality of space transverse slots 34 in the opposite end of the strap 28 and act as a worm gear. Rotation of the screw 32 in one direction reduces the circumference of the strap 28 and rotation of the screw 32 in the opposite direction lengths the circumference thereof. A screwdriver can be used to rotate the screw 32 to loosen or tighten the strap 28 around the circumference of the axle hub 12.

Referring to FIGS. 3 and 4, attached at several locations around the circumference of the strap 28 are a plurality of spring loaded retaining prongs 40. Each retaining prong 40 has an elongate central section 42 which is retained by a spot weld or the like, not shown, to the strap 28, such that when the strap 28 is fitted around the circumference of an axle hub 12 each central section 42 extends parallel to the axis 43 of the axle hub 12. Extending radially outwardly from opposite sides of the central section 42 is a pair of opposing arms 44, 45, having corners 46, 47, 48, 49.

In accordance with the invention, adjacent prongs 40 are spaced apart from one another along the strap 28 a distance equal to the length of an arc around the circumference of the axle hub 12 that separates the center lines 29 of a fixed number of ribs 22 from each other. Accordingly, when the strap 28 is fitted on an axle hub 12 having ribs 22, the strap 28 can be positioned so that when it is tightened by turning the. screw 32, each prong 40 will be positioned over one of the ribs 22. The positioning of the straps 28 so that each prong 40 is over a rib 28 provides support for the prongs 40, which assists in retaining the cover 24 over the axle hub 12. I have found that four prongs spaced for positioning over every other rib 22 of an eight rib 8½ inch axle hub or over every third rib of a twelve rib 6¼ inch axle hub works well. For cylindrical axles (those that do not have ribs) the positioning of the prongs along the strap 28 is less critical, although it is desirable that the prongs be generally evenly spaced around the circumference of the axle hub 12.

Referring to FIGS. 3 and 5, when the strap 28 is fitted on the axle hub 12, arms 44 of the prongs 40 extend generally toward the distal end of the axle hub 12 and arms 45 extend generally toward the web 16 of the wheel 10. Each of the corners 46, 47, 48, 49 of the arms 44, 45 is configured to extend radially outward from the axis 43 of the axle hub 12 a distance which is a little greater than the radius of the inner surface of the cylindrical wall of the cover 24. The prongs 40, including the arms 44 and 45 are made of steel or other metal having spring qualities enabling the arms to be compressed toward the axis 43 of the axle after which the arms will spring. back to their former orientation. The eight corners 46, 47 of the four arms 44 therefore define a circle 50 having a diameter a little greater than the diameter of the central opening of the cover 24 and the eight corners 48,49 of the arms 45 define a second circle 51 with a diameter equal to the diameter of the first circle 50, the second circle 51 position axially inward along the axle hub 12 from the first circle 50.

An 8½ inch diameter truck axle hub typically has eight ribs 22 as shown. Where the strap 28 has prongs 40 with the centers thereon spaced a distance from each other equal to twice the length of the arc of a circle between the center lines 29 of adjacent ribs 22 the strap 28 can be positioned with a prong 20 aligned over every other rib 22 as shown.

Referring to FIGS. 4 and 5, the cover 24 is retained over the axle hub 12 by manually compressing the spring arms 44, 45 and working the arms 44, 45 of the prongs 40 within the cover 24, then pushing the cover 24 over the prongs 40 until the open end 25 thereof abuts against the web 16 of the wheel 10. As the cover is pushed on, the corners 46, 47, 48, 49 of the prongs 40 will scrape along the inside of the cover 24 after which the spring arms 44, 45 will retain the cover 24 over the axle hub 12.

Figure 6:
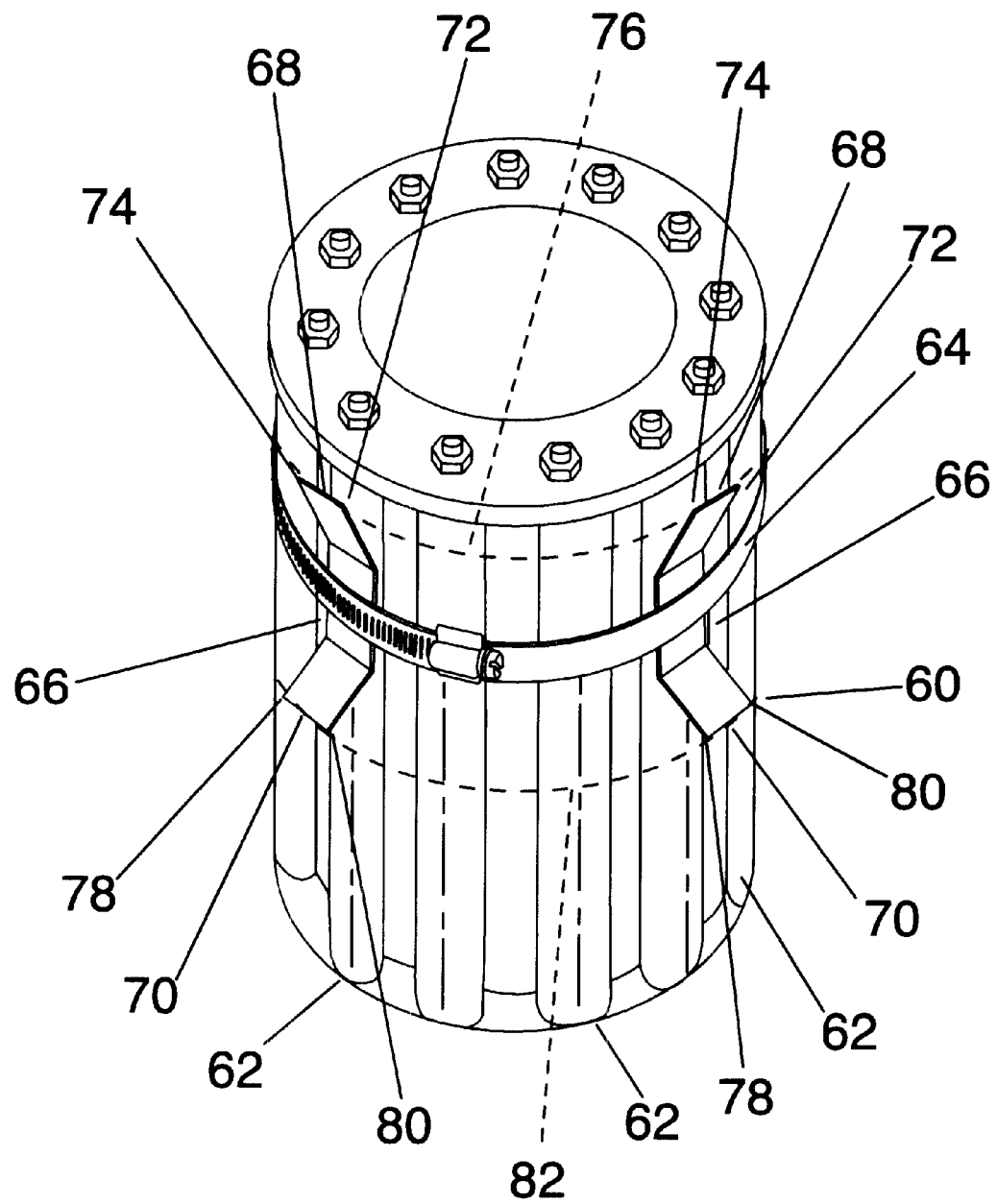

Referring to FIG. 6, the same cover 24 which is retained over the 8½ inch diameter axle 12 can be retained over a 6¼ inch diameter truck or trailer axle hub 60 having twelve ribs 62 using a suitably sized adjustable strap 64. Like the strap 28, strap 64 has four prongs 66 around the circumference thereof which are spaced from one another a distance equal to a multiple of the length of the arc between the centers of the rib 62. In this embodiment the arms 68, 70 of the prongs 66 are longer than the arms 44, 45 of prongs 28 because the distance from the outer surface of the axle hub 60 to the inner surface of the cover 24 is greater than the distance from the outer surface of axle hub 12 to the inner surface of the cover 24. The corners 72, 74 of arms 68 define a circle 76 having a diameter a little larger than the inner diameter of the cylindrical cover 24 and the corners 78, 80 of arms 70 define a second circle 82 equal in diameter to the first circle 76 and axially spaced therefrom.

To retain the cover 24 over the axle hub 60, the arms 68, 70 of the prongs 66 are manually depressed after which the cover 24 is fitted over the ends of arms 68, 70 as was done to retain the cover 24 over the 8½ inch axle 12.

As can be seen, an axle hub cover 24 can be sold along with two retainer straps, one strap 28 for retaining the cover 24 to an 8½ inch axle hub and one strap 64 for retaining the cover to a 6¼ inch axle hub. Alternately, the cover 24 and the straps 28, 64 can be sold separately.

One advantage of the present invention over prior art attachments of the type disclosed in my U.S. Pat. No. 5,366,279 is that the present invention does not require the use of a foam sleeve which is subject to deterioration. A wheel cover retained in accordance with the present invention can be removed and reinstalled many more times than a cover retained using the apparatus of my prior patent before the structure deteriorates.

While the present invention has been disclosed with respect to a single embodiment, it will be appreciated that many modifications and variations may be made without departing from the true spirit and scope of the invention. It is, therefore, the intent of the appended claims to cover all such modifications and variations which fall within the true spirit and scope of the invention.

What is claimed:

1. The method of covering an axle hub of a wheel having a generally cylindrical outer surface defined by a plurality of longitudinal ribs, said longitudinal ribs having a given spacing between the centers thereof, said method comprising the steps of providing a tubular cover body having an open end, a covered end, and an inner cylindrical surface having a given diameter, providing an annular strap having an inner surface and an outer surface and having a plurality of retainer prongs thereon, each of said retainer prongs having a radially outwardly extending arm with an outer end, said retainer prongs fixedly positioned on said strap with spacings between centers of said prongs equal to a discrete multiple of said given spacings, positioning said annular strap around said distal end of said axle hub with said inner surface against said outer surface and each of said retainer prongs positioned over one of said ribs and with said ends of said retainer prongs defining a circle having a diameter a little larger than said given diameter, and fitting said tubular cover body over said ends of said arms to retain said cover body over said axle hub.

2. The method of claim 1 wherein said strap is radially adjustable.

3. The method of claim 1 wherein said retainer prongs each have a first arm and a second arm, said first arms having a distal ends defining a first circle and said second arms having distal ends defining a second circle axially spaced along said axle from said first circle.

4. A cover for an axle hub of a wheel, said axle hub defining a cylinder having a first diameter, said cover comprising a tubular cover body having an open end, a covered end, and an inner cylindrical surface having a given inner second diameter larger than said first diameter, an annular strap having an outer surface and an inner surface, said strap sized for fitting around said first diameter of said axle hub, a plurality of retainer prongs on said strap, a screw for radially adjusting said strap whereby said strap can be tightened to said axle hub, each of said plurality of retainer prongs having a first compressible arm, said first compressible arms projecting radially outward of said outer surface of said strap, said first compressible arms having outer ends, said outer ends of said first compressible arms defining a circle having a third diameter a little greater than said second diameter of said inner surface of said tubular body, a second compressible arm on each of said retainer prongs, said second compressible arms extending radially outward of said outer surface of said strap, each said second compressible arm having an outer end, said outer ends of said second compressible arms defining a second circle having a fourth diameter a little greater than said than said second diameter of said inner surface of said tubular body, and said first and second compressible arms for retaining said tubular body thereon while said strap is fitted on said axle hub of said wheel.

* * * * *